United States Patent [19]
Webster

[11] 3,862,205
[45] Jan. 21, 1975

[54] OXIDATION OF DIAMINOMALEONITRILE TO DIIMINOSUCCINONITRILE

[75] Inventor: Owen Wright Webster, Wilmington, Del.

[73] Assignee: E. I. du Pont de Nemours and Company, Wilmington, Del.

[22] Filed: Oct. 23, 1973

[21] Appl. No.: 408,583

[52] U.S. Cl. .................................. 260/465.5 R
[51] Int. Cl. .................................. C07c 121/02
[58] Field of Search ........................ 260/465.5 R

[56] References Cited
UNITED STATES PATENTS

| | | | |
|---|---|---|---|
| 3,551,473 | 12/1970 | Hartter | 260/465.5 |
| 3,661,971 | 5/1972 | Hartter | 260/465.5 |
| 3,714,222 | 1/1973 | Hartter | 260/465.5 |

*Primary Examiner*—Joseph P. Brust

[57] ABSTRACT

Diiminosuccinonitrile is prepared by reacting diaminomaleonitrile with selected inorganic oxidizing agents at a pH of at least about 7.

7 Claims, No Drawings

OXIDATION OF DIAMINOMALEONITRILE TO DIIMINOSUCCINONITRILE

BACKGROUND OF THE INVENTION

1. Field of the Invention

This invention relates to a new process for preparing diiminosuccinonitrile.

2. Description of the Prior Art

Begland et al. (J. Am. Chem. Soc., 93, pp 4,953–5, 1971) have shown that the hydrogenation of diiminosuccinonitrile to diaminomaleonitrile can be reversed by the action of the organic compound, dichlorodicyanobenzoquinone. Hartter (U.S. Pat. No. 3,661,971) showed the reaction of diaminomaleonitrile with chlorine to yield N,N'-dichlorodiiminosuccinonitrile.

In European Chemical News, Mar. 2, 1973, p. 20, the dehydrogenation of diaminomaleonitrile in the presence of an undisclosed catalyst is mentioned. A copending application of Begland, Ser. No. 365,870, filed May 30, 1973, shows the reaction of diaminomaleonitrile with a variety of oxidizing agents under acid conditions to yield substituted pyrazines.

SUMMARY OF THE INVENTION

It has now been discovered that diiminosuccinonitrile can be prepared by reacting diaminomaleonitrile with an inorganic oxidizing agent selected from the group consisting of $MnO_2$, $NaOCl$, $PbO_2$, $Ag_2O$, $HgO$, $K_3Fe(CN)_6$, $NiO_2$, $Br_2$ and $Cl_2$ at a pH of at least about 7.

DETAILED DESCRIPTION OF THE INVENTION

The process of this invention involves the reaction in accordance with the equation

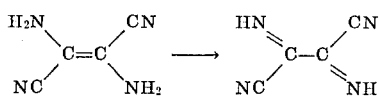

Not all inorganic oxidizing agents are effective in promoting this reaction. It has been discovered that out of the many inorganic oxidizing agents available only those described herein are effective. For example, common oxidizing agents such as $NO_2$, $Na_2Cr_2O_7$, $KMnO_7$, $KBrO_3$, air + $CuCl_2$, air + ethyl diisopropylamine, $H_2O_2$, and the like are not effective in the production of diiminosuccinonitrile.

The inorganic oxidizing agents which have been found to promote this reaction are $MnO_2$, $NaOCl$, $PbO_2$, $Ag_2O$, $HgO$, $K_3Fe(CN)_6$, $NiO_2$, $Br_2$ and $Cl_2$. Of these, $MnO_2$, $PbO_2$, $Ag_2O$, $HgO$ and $NiO_2$ are essentially basic substances and provide their own control of pH in the required range to obtain diiminosuccinonitrile. $NaOCl$ and $K_3Fe(CN)_6$ are more nearly neutral and could be used alone, but are preferably employed in the presence of a buffer substance or an added alkaline material to insure a pH of at least about 7. $Br_2$ and $Cl_2$ are acidic and will not yield diiminosuccinonitrile unless a basic material such as ammonia, an amine, an alkali metal hydroxide, or the like is also present. The preferred inorganic oxidizing agents are $MnO_2$, $PbO_2$, $Ag_2O$, $NaOCl$ and $Br_2$ because they provide yields of 50 percent or greater.

Except for the control of pH, if needed, no additives are required. The reaction may be carried out neat by impact grinding a mixture of diaminomaleonitrile with the selected oxidant.

To shorten the reaction time it is preferable to carry out the reaction in the presence of a liquid medium which is substantially inert to the reactants and products. Suitable media include hydrocarbons such as benzene and hexane, halogenated hydrocarbons such as methylene chloride, nitriles such as acetonitrile, ethers such as 1,2-dimethoxyethane and tetrahydrofuran, esters such as ethyl acetate as well as mixtures of these liquids with water. When a two-phase mixture such as water and ethyl acetate is employed, it is preferred to add an organic salt such as tetraethylammonium chloride to serve as a phase-transfer agent to speed up the reaction.

The ratio of reactants is not critical and molar ratios of diaminomaleonitrile to oxidant from about 1:100 to 100:1 may be employed. Ratios in the range of from about 1:1 to 1:10 are preferred and superior results have been obtained at a ratio of about 1:1.5 to 1:2.5. The order of addition of the reactants is not critical. When a liquid reaction medium is employed, it is convenient to add the oxidant last.

The time of reaction may vary from about a few minutes (e.g., 5) to a day or more. The stronger the oxidant the shorter the reaction time required. Since water can react with diiminosuccinonitrile to produce other products, it is preferred with aqueous reaction systems to use as short a reaction time as possible. This problem can be avoided by employing an anhydrous reaction medium and adding a drying agent such as $MgSO_4$ or dehydrated sodium or calcium aluminosilicates (molecular sieves) to absorb water as it is formed in the reaction.

The temperature of reaction may vary from about $-40°$ to $100°C$. Temperatures in the range of about $-30$ to $30°C$ are preferred. Pressure is not critical in the reaction and pressures from about 0.01 to 1,000 atmospheres may be employed. Atmospheric pressure is preferred for convenience.

Diiminosuccinonitrile is useful as a solid propellant as I have already described in U.S. Pat. No. 3,564,039. For use as a propellant, the substance is intimately mixed with a suitable oxidizing agent, e.g., a nitrate, perchlorate, etc., in weight ratios between 1:10 and 10:1. Diiminosuccinonitrile is also useful as an intermediate in the preparation of a wide variety of heterocyclic compounds as described by Begland et al. in J. Am. Chem. Soc., 39, pp. 4,953–5 (1971). For example, diiminosuccinonitrile is useful in preparing tetracyanopyrazine and aminotricyanopyrazine.

EXAMPLES OF THE INVENTION

The following examples, illustrating the novel process of this invention, are given without any intention that the intention be limited thereto. All percentages are by weight unless otherwise specified.

EXAMPLE 1

In a glass reactor a solution of 1.00 g of diaminomaleonitrile (DAMN) in 100 ml of ethyl acetate was stirred with 3 g of $MnO_2$ and 1 g of $MgSO_4$ at room temperature for 15 minutes. The resulting mixture was filtered and the clear solution evaporated to dryness. The residue weighed 0.77 g and was shown by analysis to be 95 percent diiminosuccinonitrile (DISN).

EXAMPLES 2-5

The procedure of Example 1 was repeated using the oxidants, reaction media and reaction times as shown in Table I.

TABLE I

| Example | Oxidant | DAMN (g) | CH₃CN Solvent (ml) | MgSO₄ (g) | Time (hrs) | Weight (g) | % DISN |
|---|---|---|---|---|---|---|---|
| 2 | 10 g PbO₂ | 1.00 | 50 | 5 | 2.0 | 0.57 | 95 |
| 3 | 10 g Ag₂O | 1.00 | 50 | 5 | 2.0 | 0.87 | 80 |
| 4 | 10 g HgO | 1.00 | 50 | 5 | 2.0 | 0.80 | 5 |
| 5 | 0.90 g NiO₂ | 1.08 | 50 | 5 | 0.5 | 0.80 | 30 |

EXAMPLE 6

In a glass reactor a solution of 5.40 g of DAMN in 200 ml of ethyl acetate was shaken at room temperature with a mixture of 71 ml of a 5.25 percent solution of NaOCl in water, 130 ml of a pH 7 aqueous buffer solution prepared with KH$_2$PO$_4$ and NaOH, and 0.3 g of Et$_4$NCl for 15 minutes. The ethyl acetate layer was then separated and evaporated to dryness. The residue weighed 2.6 g and was shown by analysis to be 50 percent DISN.

EXAMPLE 7

The procedure of Example 6 was repeated using K$_3$Fe(CN)$_6$ in place of NaOCl. The residue contained 10 percent of DISN.

EXAMPLE 8

A suspension of 2.16 g of DAMN in 100 ml of methylene chloride was cooled to −40°C and 4.0 ml of triethylamine was added. A solution of 1.1 ml of Br$_2$ in 25 ml of methylene chloride was added dropwise with stirring over a period of 15 minutes. The resulting mixture was filtered cold to give 1.52 g of product which was shown by analysis to be 50 percent of DISN and 50 percent of DAMN.

EXAMPLE 9

A suspension of 10.8 g of DAMN in 500 ml of methylene chloride was cooled to −40°C and 28.0 ml of triethylamine was added. Then 4.5 ml of liquid chlorine was vaporized condensed into the reaction mixture. The mixture was stirred for 1 hour at −40°C. The resulting solid was recovered by filtration, washed with ice water and dried to obtain 1.50 g of substantially pure DISN.

The embodiments of the invention in which an exclusive property or privilege is claimed are defined as follows:

1. Method of preparing diiminosuccinonitrile which comprises reacting diaminomaleonitrile with an inorganic oxidizing agent selected from the group consisting of MnO$_2$, NaOCl, PbO$_2$, Ag$_2$O, HgO, K$_3$Fe(CN)$_6$, NiO$_2$, Br$_2$ and Cl$_2$ in a molar ratio of diaminomaleonitrile to oxidizing agent of from 1:100 to 100:1 at a pH of at least 7 and a temperature of −40° to 100°C.

2. The method of claim 1 in which the molar ratio of diaminomaleonitrile to oxidant is from 1:1 to 1:10.

3. The method of claim 2 in which the temperature of the reaction is from −30° to 30°C.

4. The method of claim 1 in which the inorganic oxidizing agent is selected from the group consisting of MnO$_2$, PbO$_2$, Ag$_2$O, HgO and NiO$_2$ and the reaction is carried out under anhydrous conditions.

5. The method of claim 4 in which the temperature of the reaction is from −30° to 30°C and the molar ratio of diaminomaleonitrile to oxidant is from 1:1 to 1:10.

6. The method of claim 1 in which the inorganic oxidizing agent is selected from the group consisting of NaOCl, K$_3$Fe(CN)$_6$, Br$_2$ and Cl$_2$ and the reaction is carried out in the presence of a basic material selected from the group consisting of ammonia, amines and alkali metal hydroxides.

7. The method of claim 6 in which the molar ratio of diaminomaleonitrile to oxidant is from 1:1 to 1:10.

* * * * *